(12) United States Patent
Shapira et al.

(10) Patent No.: US 7,739,823 B2
(45) Date of Patent: Jun. 22, 2010

(54) FIRE CONTROL SYSTEM USING A LIDAR (LASER IDENTIFICATION, DETECTION AND RANGING) UNIT

(75) Inventors: Joseph Shapira, Yavne (IL); Hagai Zmora, Yavne (IL)

(73) Assignee: Soreq Nuclear Research Center, Nahal Soreq, Yavne (IL)

( * ) Notice: Subject to any disclaimer, the term of this patent is extended or adjusted under 35 U.S.C. 154(b) by 590 days.

(21) Appl. No.: 10/580,224

(22) PCT Filed: Nov. 12, 2004

(86) PCT No.: PCT/IL2004/001039

§ 371 (c)(1),
(2), (4) Date: May 22, 2006

(87) PCT Pub. No.: WO2005/050254

PCT Pub. Date: Jun. 2, 2005

(65) Prior Publication Data

US 2007/0158493 A1 Jul. 12, 2007

(51) Int. Cl.
*F41G 3/08* (2006.01)
(52) U.S. Cl. ............................. 42/114; 89/41.06; 356/3
(58) Field of Classification Search .................. 42/114, 42/115; 89/41.06; 356/27, 28, 28.5, 3, 4.01
See application file for complete search history.

(56) References Cited

U.S. PATENT DOCUMENTS

| | | | | |
|---|---|---|---|---|
| 3,558,898 A | * | 1/1971 | Block et al. | 250/575 |
| 4,182,570 A | * | 1/1980 | Courrier et al. | 356/28 |
| 5,123,730 A | * | 6/1992 | Holmes et al. | 356/28.5 |
| 6,247,259 B1 | | 6/2001 | Tsadka et al. | |
| 6,646,725 B1 | * | 11/2003 | Eichinger et al. | 356/28 |
| 2008/0297762 A1 | * | 12/2008 | Crowe | 356/5.03 |

FOREIGN PATENT DOCUMENTS

DE 3905929 C1 4/1990

* cited by examiner

*Primary Examiner*—Michael Carone
*Assistant Examiner*—Benjamin P Lee
(74) *Attorney, Agent, or Firm*—Dekel Patent Ltd.; David Klein

(57) ABSTRACT

A fire control system that includes an array of photodiode elements. For each element of the photodiode array, there is a specific optical path in the atmosphere leading from the laser to a target and back from the target to the element. Accordingly, each element of the detector array can be regarded as if illuminated by a distinct light source. For short time periods (in the range of tens to hundreds of milliseconds) the shape or spatial distribution of the refractive-index irregularities does not significantly change, and the irregularities drift with the atmospheric wind. By measuring the signal fluctuations by any element of the photodiode array, it is possible to compute the crosswind velocity. By comparing signal fluctuations patterns of two or more elements it is possible to define the wind direction and to determine the turbulence strength value.

5 Claims, 1 Drawing Sheet

FIRE CONTROL SYSTEM USING A LIDAR (LASER IDENTIFICATION, DETECTION AND RANGING) UNIT

FIELD OF THE INVENTION

The present invention is related to methods for the fire control of flat trajectory weapons, and particularly to methods for compensating for deflections due to winds.

BACKGROUND OF THE INVENTION

U.S. Pat. No. 6,247,259 to Tsadka, et al., assigned to the present assignee, describes a method for the fire control of flat trajectory weapons, which comprises the steps of measuring the target range and cross wind velocity along the intended projectile trajectory prior to firing the weapon and, using the know ballistic equations of the projectile, determining the expected vertical and horizontal deflection of the projectile and adjusting the weapon sight to compensate for said deflections.

More specifically, the method of U.S. Pat. No. 6,247,259 comprises, prior to firing the weapon, the steps of generating a laser beam at the firing position, receiving the beam reflected by the desired target, determining the target range by measuring the time lag between the generation of said laser beam and the reception of said reflected beam (viz. the double pass time of flight of the laser pulse between transmitter and target), determining the crosswind direction and velocity along the trajectory by receiving said reflected laser beam in two separate positions and measuring the intensity fluctuations of said beam in said two separate positions, determining, using the ballistic equations of the projectile, the expected vertical and horizontal deflection of the projectile, and adjusting the weapon sight to compensate for said deflections, either by a) providing the shooter with sufficient information to adjust the sight of the weapon as required by said deflections, or b) automatically adjusting said sight.

Various methods have been suggested for remote sensing of the path-averaged crosswind. Most of them depend on temporal analysis of the reflected beam intensity fluctuations that are produced when refractive-index irregularities are drifted across the beam.

By measuring a time-lagged covariance function with spaced detectors, one can find the strength and direction of the crosswind (See R. S. Lawrence et al, in Applied Optics, Vol. 11 (1972), No. 2, pp. 239-243). The limitations of systems based on this technique become apparent when paths longer than 500 m are probed. For cases of strong refractive turbulence strength $C_n^2$, scintillations saturate, and the system performance becomes unpredictable. Moreover, such a system is sensitive to nonuniformities along the propagation path (e.g., turbulence strength changes, wind fluctuations).

Ting-I Wang et al, in Applied Optics, Vol. 20 (1981), No. 23, pp. 4073-4081, compared various methods with regard to their immunity to the saturation problem as well as to $C_n^2$ and wind fluctuations along the propagation path. Their conclusion was that a frequency technique (FT), involving counting zero-crossings of the mean of the signal or width of the autocorrelation function analysis, is superior to other techniques. Nevertheless, no technique is ideal and the FT technique has its own limitations, mainly due to turbulence spectrum changes.

L. C. Andrews et al, in J. Opt. Soc. Am, Vol. 16 (1999), No. 6, pp. 1417-1429 (herein "L. C. Andrews et al."), in their heuristic model of optical scintillation, showed the existence of a definite form of coupling between the turbulence strength and the turbulence spectrum. This model was developed under the assumption that the turbulence spectrum is characterized by a two-scale behavior, one (small-scale) for diffractive irradiance fluctuations and another one (large scale) for refractive irradiance fluctuations. In accordance with this model it is possible to define the upper frequency bound (for the smallest cell size) and the lower frequency bound (for the largest cell size) in strong and in weak turbulences. Thereby it is possible to apply an envelope filter for the FT technique.

SUMMARY OF THE INVENTION

The present invention seeks to provide a Fire Control System (FCS) that is more accurate than any other prior art system. The invention is applicable over a wide range of turbulence strength changes and all wind fluctuations on paths longer than 500 m. The invention may provide automatic displacement of sight crosshairs in order to compensate for crosswind and drop of the bullet along the trajectory.

BRIEF DESCRIPTION OF THE DRAWINGS

The present invention will be understood and appreciated more fully from the following detailed description taken in conjunction with the drawing in which.

DETAILED DESCRIPTION OF EMBODIMENTS

Figure 1:
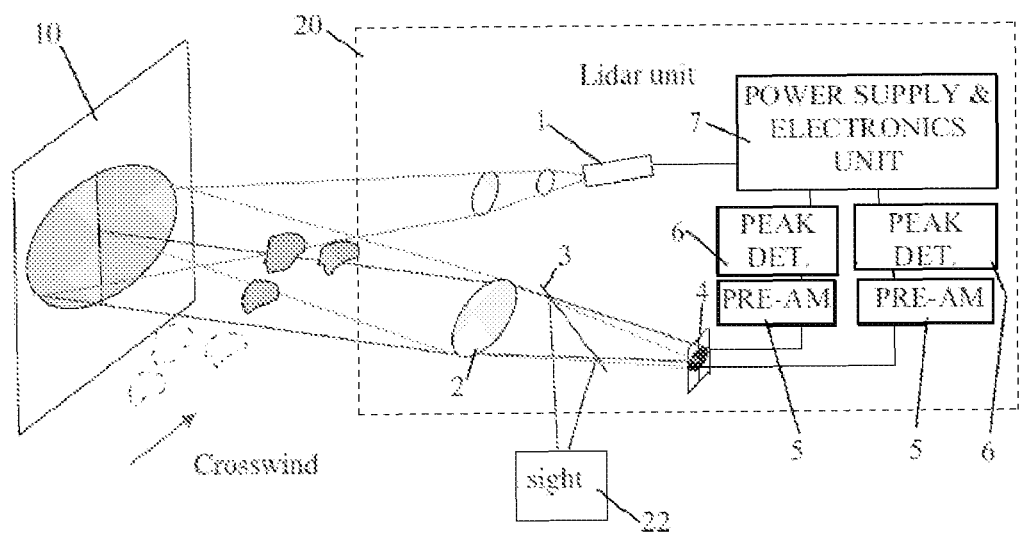
FIG. 1 is a simplified schematic illustration of a Fire Control System, constructed and operative in accordance with an embodiment of the present invention.

Reference is now made to FIG. 1, which illustrates a Fire Control System (FCS), constructed and operative in accordance with an embodiment of the present invention.

The FCS may comprise a LIDAR (laser identification, detecting and ranging) unit 20 and a night-and-day sight unit 22.

The LIDAR 20 may comprise an eye safe laser 1 (e.g., $\lambda=1.54$ μm), which may transmit short pulses at a 1 kHz rep-rate, and which may include transmitter optics for beam collimating (for example, with a divergence of 300 μRad) a beam which is transmitted to a target 10. (The invention is not limited to these exemplary values.) A collecting lens 2 may be provided with a wide bandpass, which is adapted to receive beams returning from the target 10. The collecting lens 2 may be correlated to the night-and-day sight unit 22 as well as to the wavelength of the laser. A dichroic beam splitter 3 with a narrow band pass (which may be adapted to the wavelength of the laser) may send the beam to the night-and-day sight unit 22 for processing.

A multi-element receiver 4 may be positioned at the focal plane of the collecting lens 2 (e.g., a linear InGaAs PIN or APD photodiode array, with two elements in a row or more). Other components of the LIDAR unit 20 for use with the laser 1 and the multi-element receiver 4 may include, without limitation, preamplifiers 5, peak detectors 6 and power supply and electronics unit 7.

In the horizontal plane, the field of view of the receiver optics, with all of the photodiode elements together, is equal to or greater than the laser beam divergence. Therefore, for each element of the photodiode array there is a specific optical path in the atmosphere leading from the laser to a target 10 and back from the target 10 to the element. Accordingly, each element of the detector array can be regarded as if illuminated by a distinct light source. For short time periods (in the range of tens to hundreds of milliseconds) the shape or spatial distribution of the refractive-index irregularities does not significantly change (for example, according to Taylor's hypothesis, although the invention is not limited at all to this hypothesis, and the correctness of the hypothesis is immaterial to the invention), and the irregularities drift with the atmospheric wind. By measuring the signal fluctuations (e.g., counting zero-crossings of the mean of the signal) by any element of the photodiode array, it is possible to compute the crosswind velocity. By comparing signal fluctuations patterns of two or more elements it is possible to define the wind direction (by computing the cross-correlation function) and to determine the turbulence strength value (by computing the variance of the image centroid displacements—angle-of-arrival fluctuations).

The night-and-day sight unit 22 may include a processor apparatus with processing capability for carrying out the processing and calculations described in the specification. Alternatively, a separate processor apparatus may be provided for this task.

Turbulence strength changes and wind fluctuations insensitivity for paths longer than 500 m may be determined by the following analysis:

From two-scale turbulence spectrum we choose the irregularities (fluctuations) that act as refractive lenses with focal lengths on the order of hundreds of meters or more. These are less sensitive to the saturation problem. According to L. C. Andrews et al., these are eddy cells with spatial scale $l_w \sim \rho_0$ for weak fluctuations range, and $l_s \sim L/k\rho_0$ for strong fluctuations range (L—path range, k—wave number, $\rho_0 = (1.46\ C_n^2 k^2 L)^{-3/5}$—coherence radius for plane wave). Corresponding spatial frequencies are $k_w \sim 1/\rho_0$ for weak turbulence and $k_s \sim k_s \sim k\rho_0/L$ for strong turbulence. Increasing the collecting lens aperture $D_r$ and light source size $D_t$ (laser beam spot on the target) make the system insensitive to small diffractive cells with spatial scale smaller than Fresnel zone $(L/k)^{1/2}$ for weak turbulence, and smaller than the coherence radius $\rho_0$ for strong turbulence. Diffractive cells scattering process acts as a source of a "turbulence noise" for the frequency technique crosswind measurements. The criteria for the system to remain free of diffractive cells influence are: $D_r \gg (L/k)^{1/2}$, $D_t \gg (L/k)^{1/2}$ for weak turbulence and $D_r \gg \rho_0$, and $D_t \gg \rho_0$ for strong turbulence. For example, for a path range of 800 m the criterion of the weak-strong turbulence bound (Rytov variance $\sigma_I^2 \ll 1$, where $\sigma_I^2 = 1.23\ C_n^2 k^{7/6} L^{11/6}$) is $C_{n0}^2 = 5*10^{-14}\ m^{-2/3}$ and the maximum value of $\rho_0$ is 1.5 cm for $C_n^2 > C_{n0}^2$ and the Fresnel zone value is 1.4 cm. A proposed collective lens aperture is $D_r = 8$ cm and laser divergence 0.3 mrad. Therefore for each laser source (beam spot on the target) size $D_t = 12$ cm.

The signal fluctuations frequency $f_s$ are proportional to the crosswind v and wave number $k: f_s \sim k \cdot v$. Therefore, the laser rep-rate F must be more than maximum $f_s$ for each turbulence range, that is $F_w > k_w \cdot v_{max}$ for weak turbulence. For example: L=800 m, maximum spatial frequency $k_w \sim 50\ m^{-1}$ and for $v = 10$ m/s $F_w > 500$ Hz) and
$Fs > k_s \cdot v_{max}$ for strong turbulence (L=800 m,
$k_s < 37\ m^{-1}$ and for v=10 m/s $F_s > 370$ Hz).

A possible laser rep-rate is 1000 Hz, although the invention is not limited to this value. For SNR improving (SNR~$N_{zc}/v$, where $N_{zc}$—number of zero-crossings) it is possible to use a low-pass filter.

Better accuracy of the crosswind velocity and resolving capability may be achieved by reducing the field of view of each photodiode element to 1/n of the laser beam divergence (n—number of elements in an array). This way n independent light sources are formed. Each of them has separate pattern scintillations according to its own path in the atmosphere from the laser to the receiver. The advantage is in doubling of the turbulence range and, accordingly, in the possibility to keep superior system performance even when a turbulence strength parameter $C_n^2$ is very low.

With a relatively large aperture of the collecting lens (8 cm or more), a simple configuration for merging the LIDAR and sight units may be obtained. For each unit the collecting lens requirements are in agreement, e.g., larger apertures and focal lengths are preferable. A sufficiently general merging solution is to place the dichroic beam splitter with a narrow band pass behind the collecting lens, matched to the wavelength of the laser. In this manner, the FCS may automatically displace the crosshairs with predicted crosswind deflection and bullet drop.

It will be appreciated by persons skilled in the art that the present invention is not limited by what has been particularly shown and described hereinabove. Rather the scope of the present invention includes both combinations and subcombinations of the features described hereinabove as well as modifications and variations thereof which would occur to a person of skill in the art upon reading the foregoing description and which are not in the prior art.

What is claimed is:

1. A fire control system comprising:
   a LIDAR (laser identification, detecting and ranging) unit comprising a laser adapted to transmit a beam to a target, a collecting lens for receiving a beam returning from the target, and receiver optics comprising a multi-element detector array at a focal plane of the collecting lens, wherein for each element of the multi-element detector array there is a specific optical path in the atmosphere leading from the laser to the target and back from the target to the element; and
   processor apparatus operative to measure signal fluctuations of an element of the multi-element detector array, and compute therefrom crosswind velocity of wind in the atmosphere, wherein said processor apparatus is operative to calculate turbulence strength changes and wind fluctuations insensitivity for optical paths longer than 500 m by:
   choosing fluctuations that act as refractive lenses with focal lengths on the order of hundreds of meters or more, wherein the fluctuations comprise eddy cells with a spatial scale of $l_w \sim \rho_0$ for weak fluctuations range, and $l_s \sim L/k\rho_0$ for strong fluctuations range (L—path range, k—wave number, $\rho_0 = (1.46\ C_n^2 k^2 L)^{-3/5}$—coherence radius for plane wave), wherein corresponding spatial frequencies are $k_w \sim 1/\rho_0$ for weak turbulence and $k_s \sim k\rho_0/L$ for strong turbulence.

2. The fire control system according to claim 1, wherein an aperture $D_r$ of said collecting lens and a size $D_t$ of a beam spot of said laser on the target are increased to make the system insensitive to small diffractive cells with spatial scale smaller than Fresnel zone $(L/k)^{1/2}$ for weak turbulence, and smaller than the coherence radius $\rho_0$ for strong turbulence.

3. The fire control system according to claim 1, wherein a field of view of each element of the multi-element detector array is reduced to 1/n of the laser beam divergence, wherein n is the number of elements in the multi-element detector array.

4. The fire control system according to claim 1, wherein said processor apparatus is operative to compare signal fluctuations patterns of two or more elements of the multi-element detector array, compute a cross-correlation function, and use said cross-correlation function to define a wind direction of wind in the atmosphere.

5. The fire control system according to claim 1, wherein said processor apparatus is operative to compare signal fluctuations patterns of two or more elements of the multi-element detector array, compute variances of image centroid displacements, and use said variances to determine a turbulence strength value of wind in the atmosphere.

* * * * *